United States Patent [19]

Kuriyama

[11] Patent Number: 5,005,112

[45] Date of Patent: Apr. 2, 1991

[54] REGULATED D.C.-D.C. POWER CONVERTER HAVING MULTIPLE D.C. OUTPUTS

[75] Inventor: Shigemi Kuriyama, Nagoya City, Japan

[73] Assignee: Mitsubishi Jukogyo Kabushiki Kaisha, Tokyo, Japan

[21] Appl. No.: 465,812

[22] Filed: Jan. 16, 1990

[30] Foreign Application Priority Data

Jan. 26, 1989 [JP] Japan ............................ 1-16965

[51] Int. Cl.$^5$ ............................ H02M 3/335
[52] U.S. Cl. ............................ 363/21; 363/67; 363/79
[58] Field of Search ............. 363/21, 67, 70, 97, 363/79, 80, 19

[56] References Cited

U.S. PATENT DOCUMENTS

| 4,529,927 | 7/1985 | O'Sullivan et al. | 323/222 |
| 4,649,464 | 3/1987 | Shono | 363/21 |
| 4,745,535 | 5/1988 | Sugishima et al. | 363/19 |

FOREIGN PATENT DOCUMENTS

| 58-54413 | 3/1983 | Japan . |
| 59-50772 | 3/1984 | Japan . |
| 59-175377 | 10/1984 | Japan . |
| 60-261371 | 12/1985 | Japan . |
| 62-64261 | 3/1987 | Japan . |
| 62-141969 | 6/1987 | Japan . |

OTHER PUBLICATIONS

*Transistor Technology* p. 392 (Mar. 1987).

*Primary Examiner*—William H. Beha, Jr.
*Attorney, Agent, or Firm*—Rothwell, Figg, Ernst & Kurz

[57] ABSTRACT

A power supply apparatus has a switching device for converting a D.C. input to a high-frequency power; power conversion device for converting the high-frequency power into a plurality of D.C. output powers, a voltage maintaining device for sending a feedback signal to the switching device based on the value of one of the plurality of D.C. output powers thereby controlling the switching frequency and the duty ratio of the switching device in such a manner as to maintain the voltage of the one of the plurality of D.C. output powers constant, and a hysteresis device for varying the amount of the feedback in accordance with the load current on the D.C. output power used for the feedback so as to impart a predetermined hysteresis to the voltage change caused by a change in the load current.

6 Claims, 3 Drawing Sheets

REGULATED D.C.-D.C. POWER CONVERTER HAVING MULTIPLE D.C. OUTPUTS

BACKGROUND OF THE INVENTION

1. Field of the Invention

The present invention relates to a power supply device and, more particularly, to a DC/DC power supply device which is capable of converting a D.C. input to a predetermined different D.C. output.

2. Description of the Related Art

Referring to FIG. 3 showing the circuit of a known power supply apparatus, a switching element 3 is connected to the primary winding of a high-frequency transformer 1. A power supply pulse width modulator integrated circuit 2 (abbreviated as "PWMIC" hereinafter) for controlling the switching operation of the switching element 3 is connected to the switching element 3. The switching element 3 and the PWMIC 2 in combination provides a switching device for switching the input electrical power. The PWMIC 2 is supplied with D.C. power connected between input terminals P and N through a rectifier circuit 30 which includes a current diode 4 and a smoothing capacitor 5.

Output terminals T1, T2, T3 and T4 are connected to the secondary windings W1, W2, W3 and W4 of the high-frequency transformer 1 through rectifier circuits 31, 32, 33 and 34, respectively. The rectifier circuit 31 includes a current diode 10 and a smoothing capacitor 13. Similarly, the rectifier circuits 32, 33 and 34 are composed of a current diode 16 and a smoothing capacitor 17, a current diode 18 and a smoothing capacitor 19, and a current diode 20 and a smoothing capacitor 21. Output voltages OUT1, OUT2, OUT3 and OUT4, which are insulated from one another, are delivered from these output terminals T1, T2, T3 and T4. Thus, the high-frequency transformer 1 and the rectifier circuits 31 to 34 in combination provide a power conversion means by which the high-frequency power converted from the D.C. input through the switching device 2, 3 is again converted into D.C. power.

A shunt regulator 12 and a resistor 8 are connected in series between the output terminals T1 for delivering the output power OUT 1. One resistor 14 of resistors 9 and 14 for dividing the voltage between the output terminals T1 is connected to the shunt regulator 12. A phase correction capacitor 11 is connected between the point where the shunt regulator 12 and the resistor 8 are connected and the point at which the voltage dividing resistors 9 and 14 are connected to each other. A photo-coupler 6 and a resistor 7 are connected in series across the resistor 8. The photo-coupler 6 also is connected between the F/B terminal of the PWMIC 2 and the switching element 3. The shunt regulator 12, photo-coupler 6, resistors 7 to 9 and 14, and the capacitor 11 cooperate to provide a voltage maintaining means which maintains a constant voltage between the output terminals T1 through a feedback to the PWMIC 2 and the switching element 3.

The operation of this power supply apparatus is as follows.

When a D.C. power signal of a predetermined level is supplied between the input terminals P and N, the PWMIC 2 is supplied with the power so as to start to control the switching operation of the switching element 3. In consequence, voltages are generated in the secondary windings W1 to W4 and these voltages converted into D.C. voltages by the respective rectifier circuits 31 to 34.

When a load is connected between the output terminals T1, load current flows through the winding W1 so that a voltage drop appears across the winding W1. In consequence, the voltage between the output terminals T1 varies according to the load current. The voltage between the output terminals T1 is divided by the resistors 9 and 14 and, if the voltage obtained through the division is higher than a reference voltage set by the shunt regulator 12, the shunt regulator 12 becomes conductive so that a feedback signal is sent to the PWMIC 2 and the switching element 3 through the photo-coupler 6. In consequence, both the switching frequency and the duty ratio of the switching element are reduced and the voltage generated in the winding W1 is lowered. Conversely, when the voltage produced as a result of the division is lower than the above-mentioned reference voltage, no feedback is made to the PWMIC 2 and the switching element 3. In this case, the switching operation is conducted at the switching frequency and the duty ratio which have been set in the PWMIC 2, with the result that the voltage generated in the winding W1 is raised.

It is therefore possible to maintain the voltage between the output terminals T1 at the desired level, by suitably selecting the resistance values of the resistors 7 and 14. The output voltage is maintained constant regardless of a change in the input D.C. voltage. Furthermore, since the voltage across the winding W1 is constant, other windings W2 to W4 also produce output power of constant voltage levels corresponding to the ratio of turns of windings.

Thus, in the known power supply apparatus, the output voltage in one output winding W1 of a plurality of output windings is fed back to the input switching device which is composed of the PWMIC 2 and the switching element 3, so as to change the switching frequency and the switching duty ratio, thereby preventing any change in the output voltage between the output terminals T1 attributable to the voltage drop across the winding W1 caused by the load current.

This known power supply apparatus suffers from a disadvantage in that, although the output voltage between the output terminals T1 is stabilized, the voltages generated in other windings W2, W3 and W4 are undesirably changed due to the changes in the switching frequency and the duty ratio in the switching device. Namely, the windings W2, W3 and W4 are directly influenced by the level of the load current flowing through the winding W1.

SUMMARY OF THE INVENTION

Accordingly, an object of the present invention is to provide a power supply apparatus in which a feedback signal is sent from one of a plurality of output windings to the input side so as to stabilize the output voltage generated in this output winding, while suppressing any influence to other output windings, thereby overcoming the above-described problems of the prior art.

To this end, according to the present invention, there is provided a power supply apparatus comprising: switching means for converting a D.C. input to a high-frequency power; power conversion means for converting the high-frequency power into a plurality of D.C. powers; voltage maintaining means for effecting feedback to the switching means by using one of the plurality of D.C. output powers thereby controlling the switching frequency and the duty ratio of the switching means in such a manner as to maintain the voltage of the one of the plurality of D.C. output powers constant; and hysteresis means for varying the amount of the feedback in accordance with a load current on the D.C. output power used for the feedback so as to impart a predetermined hysteresis to the voltage change caused by a change in the load current.

DESCRIPTION OF THE PREFERRED EMBODIMENTS

Preferred embodiments of the present invention will be described with reference to the accompanying drawings.

Figure 1:
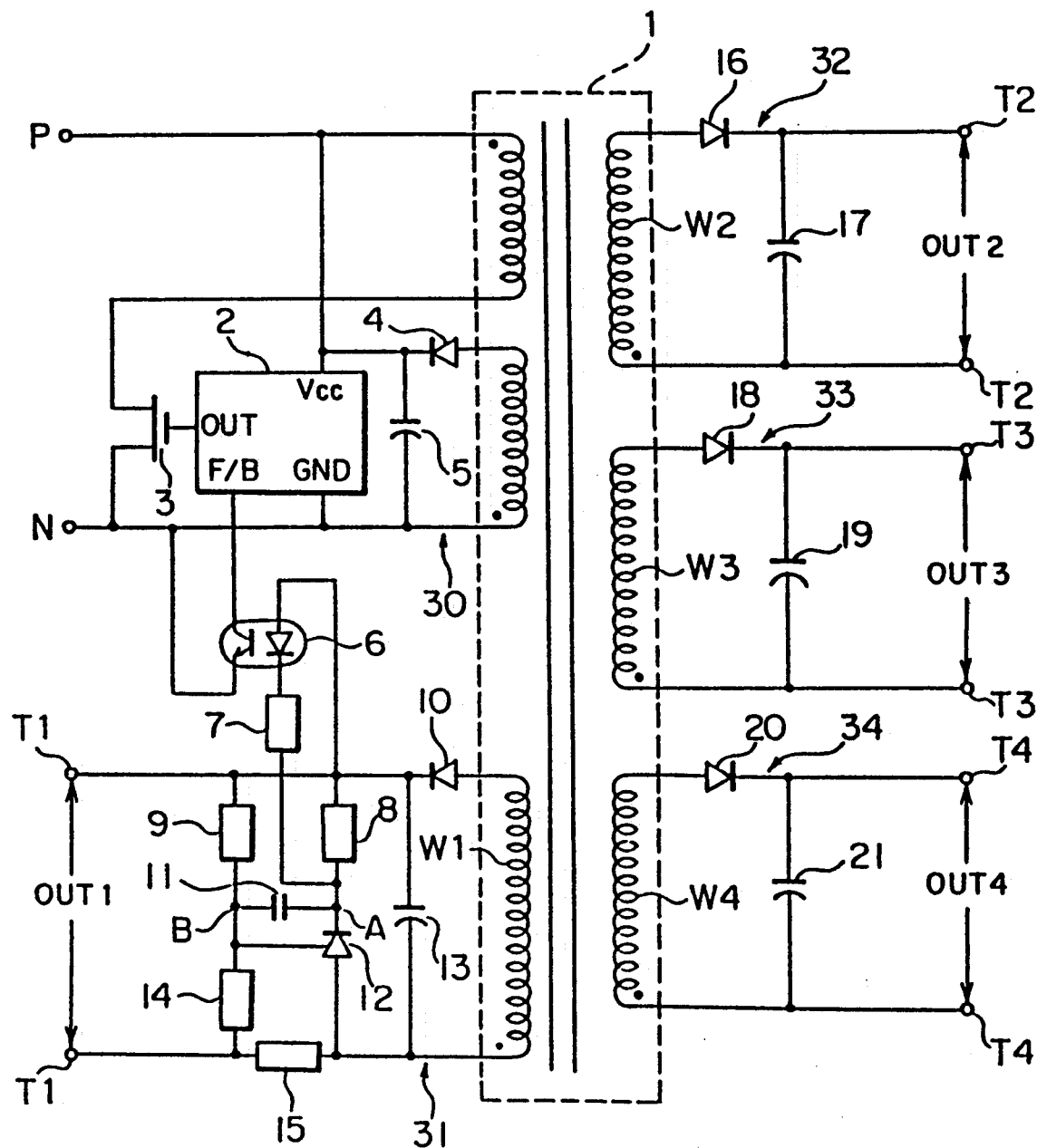
FIG. 1 is a circuit diagram showing the circuit of an embodiment of a power supply apparatus in accordance with the present invention.

Referring to FIG. 1, a switching element 3 is connected to the primary winding of a high-frequency transformer 1. A PWMIC 2 for controlling the switching operation of the switching element 3 is connected to the switching element 3. The switching element 3 and the PWMIC 2 in cooperation provide a switching means for switching the input power. The high-frequency transformer 1 is connected to the PWMIC 2 through a rectifier circuit 30 which is composed of a current diode 4 and a smoothing capacitor 5.

Output terminals T1, T2, T3 and T4 are connected to secondary windings W1, W2, W3 and W4 of the high-frequency transformer 1 through rectifier circuits 31, 32, 33 and 34 which include, respectively, a current diode 10 and a smoothing capacitor 13, a current diode 16 and a smoothing capacitor 17, a current diode 18 and a smoothing capacitor 19, and a current diode 20 and a smoothing capacitor 21. D.C. output voltages OUT1, OUT2, OUT3 and OUT4 insulated from one another are delivered from these output terminals T1, T2, T3 and T4. The high-frequency transformer 1 and the rectifier circuits 31 to 34 in cooperation provide a power conversion means by which the high-frequency power obtained from the D.C. input through conversion by the switching means is again converted into a D.C. power.

A shunt regulator 12 and a resistor 8 are connected in series between the output terminals T1 from which the output power OUT 1 is delivered. One resistor 14 of resistors 9 and 14 for dividing the voltage between the output terminals T1 is connected to the shunt regulator 12. A phase correction capacitor 11 is connected between a point where the resistor 8 is connected to the shunt regulator 12 and the point B junction between the voltage dividing resistors 9 and 14. A photo-coupler 6 and resistor 7 are connected in series across the resistor 8. The photo-coupler 6 also is connected to the F/B terminal of the PWMIC 2 and the switching element 3.

The shunt regulator 12, photo-coupler 6, resistors 7 to 9 and 14, and the capacitor 11 in cooperation provide a voltage maintaining means which sends a feedback signal PWMIC 2 and the switching element 3 so as to maintain the voltage between the output terminals T1 at a constant level.

A resistor 15 is connected between the shunt regulator 12 and the voltage dividing resistor 14 in series with the secondary winding W1 of the high-frequency transformer 1. This resistor 15 serves as a hysteresis means which produces a predetermined hysteresis to the voltage change attributable to the load current flowing between the output terminals T1.

Figure 3:
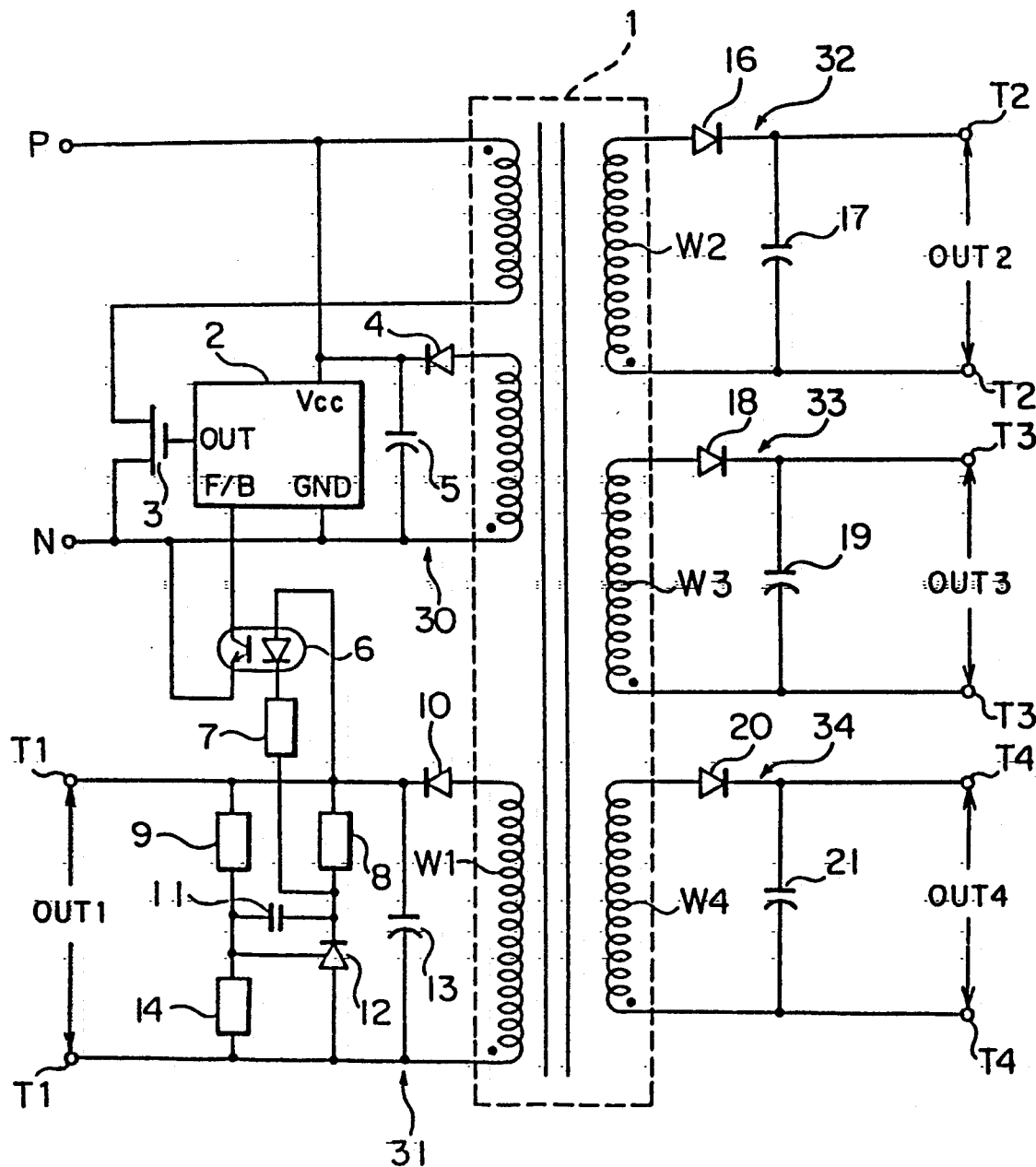
FIG. 3 is a circuit diagram showing the circuit of a known power supply apparatus.

The operation of this embodiment is as follows. The operation is the same as that of the known apparatus shown in FIG. 3, when no load current flows between the output terminals T1. Namely, when the voltage generated in the winding W1 of the high-frequency transformer 1 is so high that the voltage across the resistor 14 is higher than the reference voltage set by the shunt regulator 12, the shunt regulator 12 becomes conductive so that a feedback signal is sent to the PWMIC 2 and the switching element 3 through the photo-coupler 6. In consequence, the switching frequency and the duty ratio are lowered so that the voltage generated in the winding W1 is lowered. Conversely, when the voltage across the resistor 14 is lower than the reference voltage set by the shunt regulator 12, the shunt regulator is turned off so that no feedback is sent to the PWMIC 2 and the switching element 3. In consequence, the switching element 3 performs switching at the switching frequency and the duty ratio which have been set in the PWMIC 2 so that the voltage generated in the winding W1 is increased, whereby the voltage between the output terminals T1 is maintained constant.

When a load current flows between the output terminals T1, a voltage drop appears across the winding W1 of the high-frequency transformer, so that the output voltage between the output terminals T1 is lowered. This in turn causes a drop in the voltage across the resistor 14, i.e., in the voltage divided. However, the resistor 15, which is connected in series with the secondary winding W1 of the high-frequency transformer 1 between the shunt regulator 12 and the voltage dividing resistor 14, serves to increase the voltage applied to the shunt regulator 12 by an amount corresponding to the voltage drop across the resistor 15 caused by the load current. Therefore, the amount of feedback from the voltage maintaining means to the switching means is changed in accordance with the level of the load current flowing through the resistor 15. In consequence, if the resistance value of the resistor 15 is determined to be smaller than the resistance value of the winding W1, only a part of the voltage drop through the winding W1 is fed back to the switching means. As a result, fluctuations in the voltages generated in the windings W2, W3 and W4 are suppressed, although the fluctuation of the voltage between the output terminals T1 attributable to the voltage drop through the winding w1 is not completely eliminated.

Figure 2:
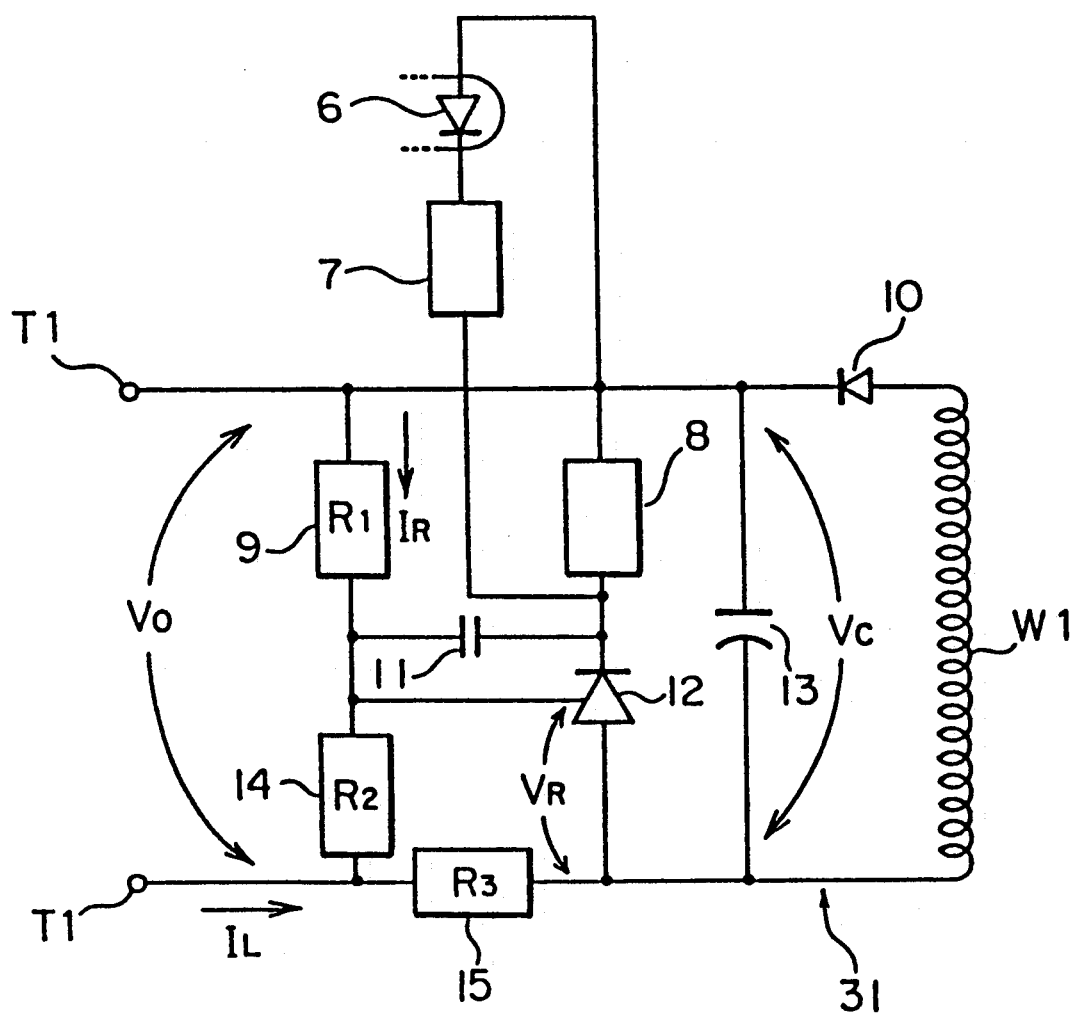
FIG. 2 is a circuit diagram showing a critical portion of the embodiment shown in FIG. 1.

Referring to FIG. 2, the resistance values of the resistors 9, 14 and 15 are represented by R1, R2 and R3. The voltage between the output terminals T1, the output voltage of the rectifier circuit 31 and the voltage applied to the shunt regulator 12 are expressed by $V_O$, $V_C$ and $V_R$, respectively. The current flowing through the resistor 9 is expressed by $I_R$, while the load current is represented by $I_L$.

The voltages $V_C$ and $V_R$ are expressed as follows.

$$V_C = R1 \cdot I_R + V_R \quad (1)$$

$$V_R = R2 \cdot I_R + R3 \, (I_R + I_L) \quad (2)$$

In addition, the current $I_R$ and the voltage $V_O$ are given by:

$$I_R = (V_R - R3 \cdot I_L)/(R2 + R3) \quad (3)$$

$$V_O = (R1 + R2)I_R \quad (4)$$

Consequently, the voltages $V_C$ and $V_O$ are given as follows.

$$V_C = R1(V_R - R3 \cdot I_L)/(R2 + R3) + V_R \quad (5)$$

$$V_O = (R1 + R2)(V_R - R3 \cdot I_L)/(R2 + R3) \quad (6)$$

If the resistor 15 is not provided, i.e., if R3=0, the voltages $V_C$ and $V_O$ are equal to each other ($V_C = V_O$). Thus, the fluctuation of the voltage between the output terminals T1 attributable to the voltage drop through the winding W1 is completely eliminated. In this case, however, the voltages generated in other secondary windings W2 to W4 are undesirably caused to fluctuate largely. Conversely, if the resistance value R3 of the resistor 15 is determined to be equal to the resistance value of the winding W1, the fluctuation of the voltage between the output terminals T1 attributable to the voltage drop through the winding W1 cannot be avoided, but the influence on other windings W2 to W4 is completely avoided: namely, the fluctuations of voltages generated in the windings W2 to W4 can be prevented. It is therefore possible to restrict the amount of feedback to the switching means in response to a change in the load current in the winding W1 so as to suppress influence of the feedback on other windings W2 to W4, by designing such that the resistor 15 takes a suitable resistance value R3 ranging between 0 and the resistance value of the winding W1. It will be understood that this arrangement appreciably stabilizes the voltage in the winding W1 while effectively preventing any unfavorable effect on other windings W2 to W4.

Although the described embodiment employs a flyback type switching regulator, this is only exemplary and the invention can be carried out with, for example, a feed-forward type switching regulator. The PWMIC 2, used as a circuit for controlling the switching element 3 in the described embodiment, may be substituted by various other suitable control circuits.

What is claimed is:

1. A regulated D.C.-D.C power converter having multiple D.C. outputs, comprising:
    switching means for converting a DC. input to a high-frequency power;
    power conversion means for converting said high-frequency power into a plurality of D.C. output powers at a plurality of output terminals;
    feedback means for monitoring the D.C. voltage at one of said plurality of output terminals and providing a feedback signal to said switching means when the monitored D.C. voltage deviates from a predetermined value to alter the operation of said switching means so as eliminate said deviation; and
    hysteresis means for varying the value of said monitored D.C. voltage in accordance with the amount of load current drawn by a load connected to said one output terminal so as to cause a hysteresis change in the output D.C. voltage at said one output terminal in accordance with a change in said load current.

2. A regulated D.C.-D.C. power converter having multiple D.C. outputs, comprising:
    switching means for converting a D.C. input to a high frequency power;
    power conversion means for converting said high frequency power into a plurality of D.C. output powers;
    voltage maintaining means for providing a feedback signal to said switching means by using one of said plurality of D.C. output powers thereby controlling the switching frequency and the duty ratio of said switching means in such a manner as to maintain the voltage of said one of said plurality of D.C. output powers constant, said voltage maintaining means including voltage dividing means for dividing the voltage of the D.C. output power used for said feedback signal to said switching means, a shunt regulator which operates with the divided voltage produced by said voltage dividing means, and feedback means for outputting said feedback signal to said switching means according to the operative state of said shunt regulator; and
    hysteresis means for varying the amount of said divided voltage in accordance with a load current on said D.C. output power used for said feedback signal so as to impart a predetermined hysteresis to the voltage change caused by a change in said load current.

3. A power converter according to claim 1, wherein said switching means includes a switching element, and a switching control circuit for controlling the switching operation of said switching element.

4. A power converter according to claim 3, wherein said switching control circuit includes a pulse width modulator integrated circuit.

5. A power converter according to claim 1, wherein said power conversion means includes a high-frequency transformer, and a plurality of rectifier circuits connected to said high-frequency transformer.

6. A power converter according to claim 1, wherein said hysteresis means includes a resistor which is connected in series to an output terminal of said power conversion means from which said D.C. output power used for the feedback is picked up and which is connected between said voltage dividing means and said shunt regulator.

* * * * *

UNITED STATES PATENT AND TRADEMARK OFFICE
CERTIFICATE OF CORRECTION

PATENT NO. : 5,005,112

DATED : April 2, 1991

INVENTOR(S) : Kuriyama

It is certified that error appears in the above-identified patent and that said Letters Patent is hereby corrected as shown below:

Cover Page, References, please add:

U.S. PATENT DOCUMENTS

| DOCUMENT NO. | DATE | NAME | CLASS | SUB-CLASS |
|---|---|---|---|---|
| 4,660,136 | 4/87 | Montorefano | 363 | 67 |
| 4,353,113 | 10/82 | Billings | 363 | 21 |

FOREIGN PATENT DOCUMENTS

| DOCUMENT NO. | DATE | NAME OF COUN. | CLASS | ~~SUB~~-CLASS |
|---|---|---|---|---|
| 2,147,125 | 5/85 | United Kingdon | 363 | 21 |

OTHER REFERENCES

Alberkrack, et al., "Scaling Down PWM Chip Suits Low-Power Switchers", Elect. Design, Vol. 30, No. 4, pp. 175-9, July 8, 1982 (363/21)

Col. 1, line 21: change "provides" to --provide--
Col. 2, line 15: add --3-- to the end of the line
Col. 3, line 64: insert --to the-- before PWMIC

UNITED STATES PATENT AND TRADEMARK OFFICE
CERTIFICATE OF CORRECTION

PATENT NO. : 5,005,112

DATED : April 2, 1991

INVENTOR(S) : Kuriyama

It is certified that error appears in the above-identified patent and that said Letters Patent is hereby corrected as shown below:

Col. 4, line 34: change "divided" to --divider--
Col. 5, line 50: change "DC." to --,D.C.--

Signed and Sealed this

Eighteenth Day of May, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,005,112
DATED : April 2, 1991
INVENTOR(S) : Shigemi Kuriyama

It is certified that error appears in the above-indentified patent and that said Letters Patent is hereby corrected as shown below:

On the Title page, item [73], Assignee: delete the present assignee and insert the following:
--Mitsubishi Denki Kabushiki Kaisha--.

Signed and Sealed this

Seventh Day of June, 1994

Attest:

BRUCE LEHMAN

*Attesting Officer*  Commissioner of Patents and Trademarks